US012741282B2

(12) United States Patent
Wu et al.

(10) Patent No.: US 12,741,282 B2
(45) Date of Patent: Sep. 22, 2026

(54) ELECTROWETTING-ON-DIELECTRIC (EWOD) DEVICE

(71) Applicant: CYTESI, INC., Menlo Park, CA (US)

(72) Inventors: Tung-Yu Wu, Menlo Park, CA (US); Tsung-Yuan Wu, Menlo Park, CA (US)

(73) Assignee: CYTESI, INC, Menlo Park, CA (US)

( * ) Notice: Subject to any disclaimer, the term of this patent is extended or adjusted under 35 U.S.C. 154(b) by 144 days.

(21) Appl. No.: 18/666,403

(22) Filed: May 16, 2024

(65) Prior Publication Data

US 2024/0382965 A1 Nov. 21, 2024

Related U.S. Application Data

(60) Provisional application No. 63/503,355, filed on May 19, 2023.

(51) Int. Cl.
*B01L 3/00* (2006.01)

(52) U.S. Cl.
CPC ..... *B01L 3/502792* (2013.01); *B01L 3/50273* (2013.01); *B01L 2300/0645* (2013.01); *B01L 2300/161* (2013.01); *B01L 2300/1833* (2013.01)

(58) Field of Classification Search
CPC ........... B01L 3/502792; B01L 3/50273; B01L 2300/0645; B01L 2300/161; B01L 2300/1833
See application file for complete search history.

(56) References Cited

U.S. PATENT DOCUMENTS

| | | | | |
|---|---|---|---|---|
| 6,565,727 B1 * | 5/2003 | Shenderov | B01L 3/502746 | 204/600 |
| 9,841,402 B2 * | 12/2017 | Amos | B01L 3/502792 | |
| 2002/0043463 A1 * | 4/2002 | Shenderov | B01L 3/502784 | 204/603 |
| 2004/0055891 A1 * | 3/2004 | Pamula | B01L 3/5027 | 205/133 |
| 2004/0231987 A1 * | 11/2004 | Sterling | F04B 19/006 | 204/600 |
| 2006/0146099 A1 * | 7/2006 | Wang | B41J 2/005 | 347/75 |
| 2012/0044299 A1 * | 2/2012 | Winger | B41J 2/1606 | 428/411.1 |

(Continued)

OTHER PUBLICATIONS

Geng et al., "Antifouling digital microfluidics using lubricant infused porous filmt," Lab Chip, 2019, 19, 2275 (Year: 2019).*

(Continued)

*Primary Examiner* — Alexander S Noguerola
(74) *Attorney, Agent, or Firm* — Abel Schillinger, LLP

(57) ABSTRACT

Provided is an electrowetting-on-dielectric (EWOD) device. The EWOD device comprises a first substrate and a second substrate opposite to the first substrate. The first substrate comprises a plurality of first electrodes configured to be respectively controllably connected to signal lines. The first hydrophobic layer disposed over the plurality of first electrodes. The second substrate comprises a second electrode configured to be connected to the signal lines. The second hydrophobic layer disposed over the second electrode. An internal space between the first substrate and the second substrate is provided for receiving a droplet and a surrounding medium. The droplet is surrounded by the surrounding medium.

16 Claims, 9 Drawing Sheets

(56) References Cited

U.S. PATENT DOCUMENTS

| | | | | |
|---|---|---|---|---|
| 2019/0262829 | A1* | 8/2019 | Umapathi | G02B 26/005 |
| 2021/0008557 | A1* | 1/2021 | Holden | G01N 33/48721 |

OTHER PUBLICATIONS

Hao et al., "Electrowetting on liquid-infused film (EWOLF): Complete reversibility and controlled droplet oscillation suppression for fast optical imaging," Scientific Reports | 4 : 6846 | DOI: 10.1038/srep06846, Published Oct. 30, 2014 (Year: 2014).*

Yamamoto et al., "Lubrication effects on droplet manipulation by electrowetting-on-dielectric (EWOD)," J. Appl. Phys. 132, 204701 (2022) with Supplemental Information (Year: 2022).*

Barman, Snigdha Roy; Khan, Imran; Chatterjee, Subhodeep; Saha, Subhajit; Choi, Dukhyun; Lee, Sangmin; and Lin, Zong-Hong (2020) "Electrowetting-on-dielectric (EWOD): Current perspectives and applications in ensuring food safety," Journal of Food and Drug Analysis: vol. 28 : Iss. 4 , Article 8 (Year: 2020).*

Cao et al., "Electrowetting on liquid-infused membrane for flexible and reliable digital droplet manipulation and application," Sensors & Actuators: B. Chemical 291 (2019) 470-477 (Year: 2019).*

Chempoint—Krytox™ Oils product overview, 2025, https://www.chempoint.com/products/chemours/krytox-oils (Year: 2025).*

3m Technical data publication for Fluorinert™ Electronic Liquid FC-70 , 2019 (Year: 2019).*

* cited by examiner

ELECTROWETTING-ON-DIELECTRIC (EWOD) DEVICE

CROSS-REFERENCE TO RELATED APPLICATIONS

This application claims the benefit and priority to the U.S. Provisional Patent Application No. 63/503,355 filed on May 19, 2023, the entirety of which is incorporated herein by reference.

TECHNICAL FIELD

The present disclosure generally relates to a droplet microfluidic (DMF) apparatus. More particularly, the present disclosure relates to a droplet microfluidic apparatus with an electrowetting-on-dielectric (EWOD) device.

BACKGROUND

Microfluidics provide liquid management based on droplets. The droplets on the chip serve to transport a variety of reaction materials, including biochemical reagents, cells, proteins, DNA, and RNA. Microfluidics allow software-reconfigurable operations on individual droplets, such as movement, combination, splitting, and dispensation from reservoirs by manipulating Pico liter to Nano liter scale droplets in electric fields. A variety of experiments are accommodated by modular functional components (temperature control, magnetic attraction, fluorescence detection, etc.). Control in microfluidics is based on the principle of Electrowetting on Dielectric (EWOD), in which, when there is liquid on the electrode, and a potential is applied to the electrode, the wettability of the solid-liquid interface at the corresponding position of the electrode can be changed, and the contact angle of the droplet-electrode interface changes accordingly. If there is a potential difference between the electrodes in the droplet area, a lateral driving force will be generated because of the contact angle difference, causing the droplet to move laterally on the electrode substrate.

In recent years, more and more applications of DMF apparatuses using EWOD have emerged. The DMF application has the ability to precisely manipulate and move small, discrete volumes of fluids. Hence, EWOD is one of the most promising methods to miniaturize analytical tools. Recent developments of electrowetting are concerned with "Lab-on-a-Chip" (LoC), EWOD-based displays, biological environmental monitoring, droplet digital polymerase chain reaction (ddPCR), biological analysis, and etc.

Specifically, the droplet microfluidic apparatus includes electrodes to manipulate or process droplets of fluid (e.g., moving, splitting, merging, or heating the droplets) in a defined space. Specially, each droplet, acting as an independent reactor, allows a wide range of multiple parallel biological and chemical reactions on a microscale.

SUMMARY

Some embodiments of the present disclosure provide an electrowetting-on-dielectric (EWOD) device, comprising: a first substrate; and a second substrate opposite to the first substrate; the first substrate comprising: a plurality of first electrodes configured to be respectively controllably connected to signal lines; a first hydrophobic layer disposed over the plurality of first electrodes; the second substrate comprising: a second electrode configured to be connected to the signal lines; a second hydrophobic layer disposed over the second electrode; an internal space between the first substrate and the second substrate for receiving a droplet and a surrounding medium, the droplet surrounded by the surrounding medium, wherein the surrounding medium is fluorinated oil.

Some embodiments of the present disclosure provide an electrowetting-on-dielectric (EWOD) device, comprising: a first substrate; and a second substrate opposite to the first substrate; the first substrate comprising: a plurality of first electrodes configured to be respectively controllably connected to signal lines; a first hydrophobic layer disposed over the plurality of first electrodes; the second substrate comprising: a second electrode configured to be connected to the signal lines; a second hydrophobic layer disposed over the second electrode; an internal space between the first substrate and the second substrate for receiving a droplet and a surrounding medium, the droplet surrounded by the surrounding medium, wherein the first hydrophobic layer is covered by an infused liquid layer, wherein at least one of the first hydrophobic layer and the second hydrophobic layer has a textured surface, wherein at least one of the first hydrophobic layer and the second hydrophobic layer comprises a fluoropolymer in a solid form, and wherein the infused liquid layer is fluorinated oil.

BRIEF DESCRIPTION OF THE DRAWINGS

The aspects of the present disclosure will become more easily understood from the following detailed description made with reference to the accompanying drawings. It should be noted that, various features may not be drawn to scale. In fact, the sizes of the various features may be increased or reduced arbitrarily for the purpose of clear description.

DETAILED DESCRIPTION

Figure 1A:
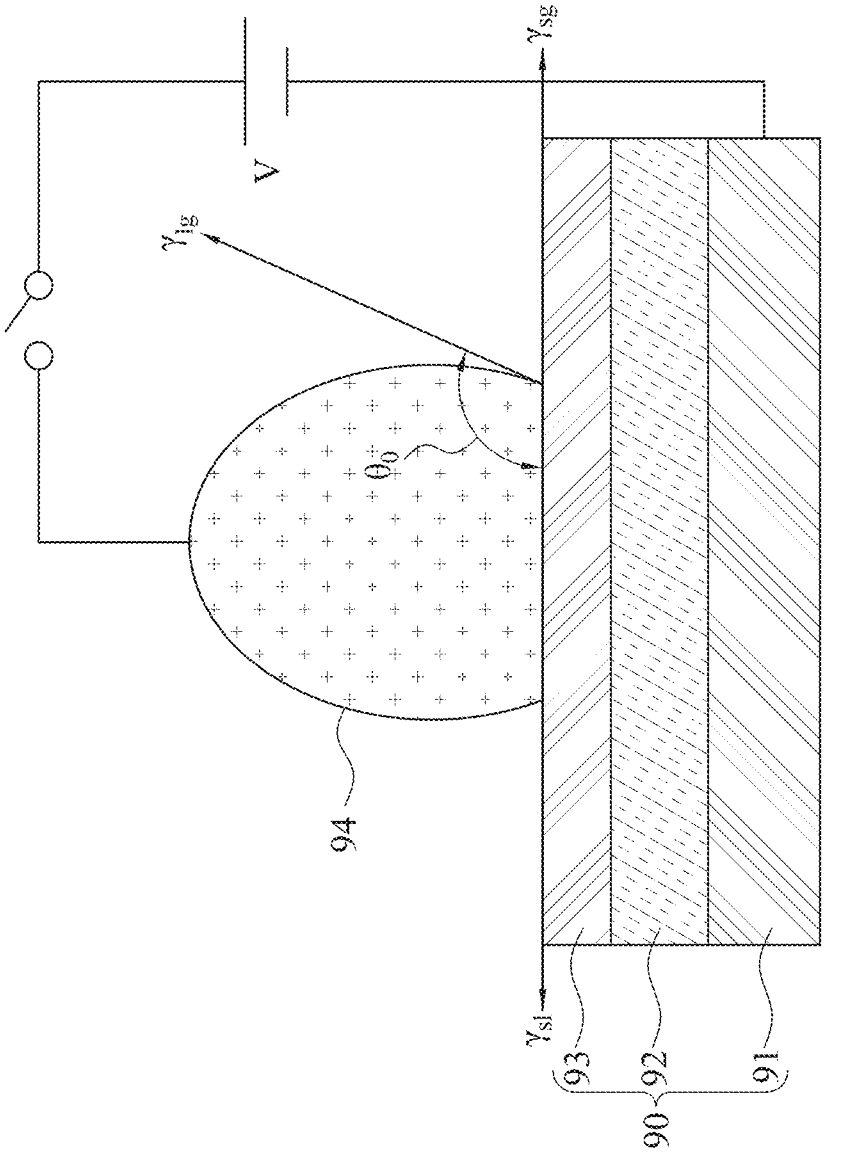
FIGS. 1A and 1B are schematic views of an EWOD device.

The following disclosure provides many different embodiments, or examples, for implementing different features of the provided subject matter. Specific examples of components and arrangements are described below to explain certain aspects of the present disclosure. These are, of course, merely examples and are not intended to be limiting. For example, the formation of a first feature over or on a second feature in the description that follows may include embodiments in which the first and second features are formed or disposed in direct contact, and may also include embodiments in which additional features may be formed or disposed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Spatial descriptions, such as "above," "below," "up," "left," "right," "down," "top," "bottom," "vertical," "horizontal," "side," "higher," "lower," "upper," "over," "under," and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of embodiments of this disclosure are not deviated from by such arrangement.

It should be noted that the structures, proportions, sizes, etc. shown in the drawings of the specification are only used to match the content recorded in the specification for the understanding and reading of those skilled in the art, and are not used to limit the implementation of this application, so it has no technical substantive meaning. Any modification of structure, change of proportional relationship or adjustment of size, without affecting the effect and purpose of this application, should still fall within the scope of this application. The disclosed technical content must be within the scope covered. At the same time, terms such as "above", "first", "second" and "one" quoted in this specification are only for the convenience of description and are not used to limit the scope of implementation of this application. The change or adjustment of the relative relationship shall also be regarded as the implementable scope of the present application without substantive change in the technical content.

Figure 1B:
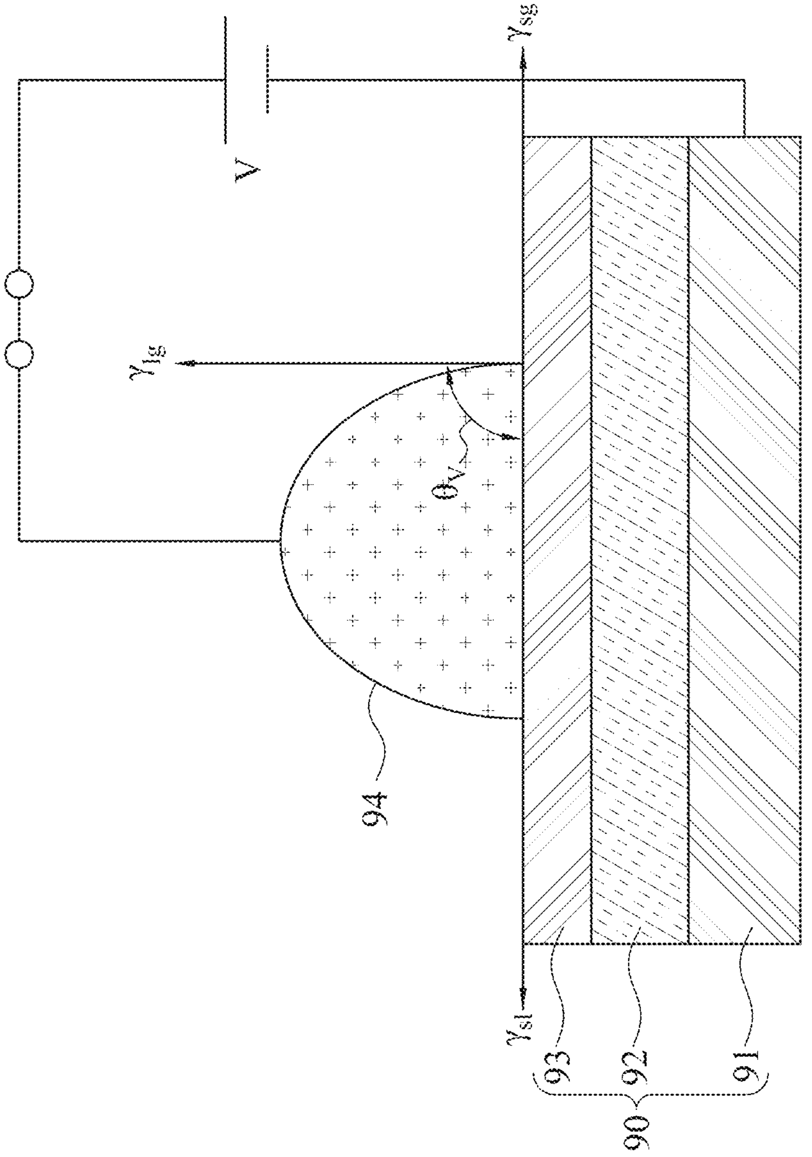

It should also be noted that the longitudinal section corresponding to the embodiments of the present application can correspond to the front view, the transverse section can correspond to the right view, and the horizontal section can correspond to the top view FIGS. 1A and 1B are structural diagrams of an EWOD device of an open configuration.

A droplet 94 is deposited on a bottom plate 90. The bottom plate 90 includes an electrode layer 91, a dielectric layer 92 and a hydrophobic layer 93.

The droplet 94 is deposited on the hydrophobic layer 93, and leaves in an open space. The droplet 94 may be surrounded in an ambient air or gas. The hydrophobic layer 93 is disposed over the dielectric layer 92. The dielectric layer 92 is formed on the electrode layer 91. In the other words, no solid electrode is placed on the droplet 94 opposite to the electrode layer 91.

The droplet 94 is deposited on the hydrophobic layer 93 with the action of surface tension at a contact angle $\theta_0$. The contact angle $\theta_0$ is determined by a balance among surface tensions of solid-liquid ($\gamma_{sl}$), liquid-gas ($\gamma_{lg}$) and solid-gas ($\gamma_{sg}$).

A power supply with voltage V may be applied to the droplet 94. One terminal of the power supply electrically connects to the droplet 94 and the other terminal of the power supply electrically connects to electrode layer 91. Upon the voltage V is supplied, the solid-liquid surface tension γsl at the solid-liquid interface decreases. As shown in FIG. 1B, the contact angle decreases from $\theta_0$ to $\theta_V$. The droplet appears "wetted" on the hydrophobic layer 94. By adjusting the electric potential applied between the liquid and the electrode, the surface tension is changed, thus the contact angle is changed, which is called as electrowetting phenomenon.

Upon the voltage applied to the droplet is changed, a changed surface tension leads to a different contact angle, and thus the droplet may start moving.

Another embodiment (not shown) involves an EWOD device of a closed configuration. The droplet is sandwiched between two electrodes. A top plate includes a hydrophobic layer, a dielectric layer and an electrode. The top plate is placed on the droplet opposite to the bottom plate. A voltage may apply to the droplet through an electrode layer of the top plate and an electrode layer of the bottom plate so as to control the droplet.

In the above embodiments, the droplet is surrounded by an ambient air or gas. We may face a problem that the droplet may be evaporated in the ambient air or gas.

Figure 2A:
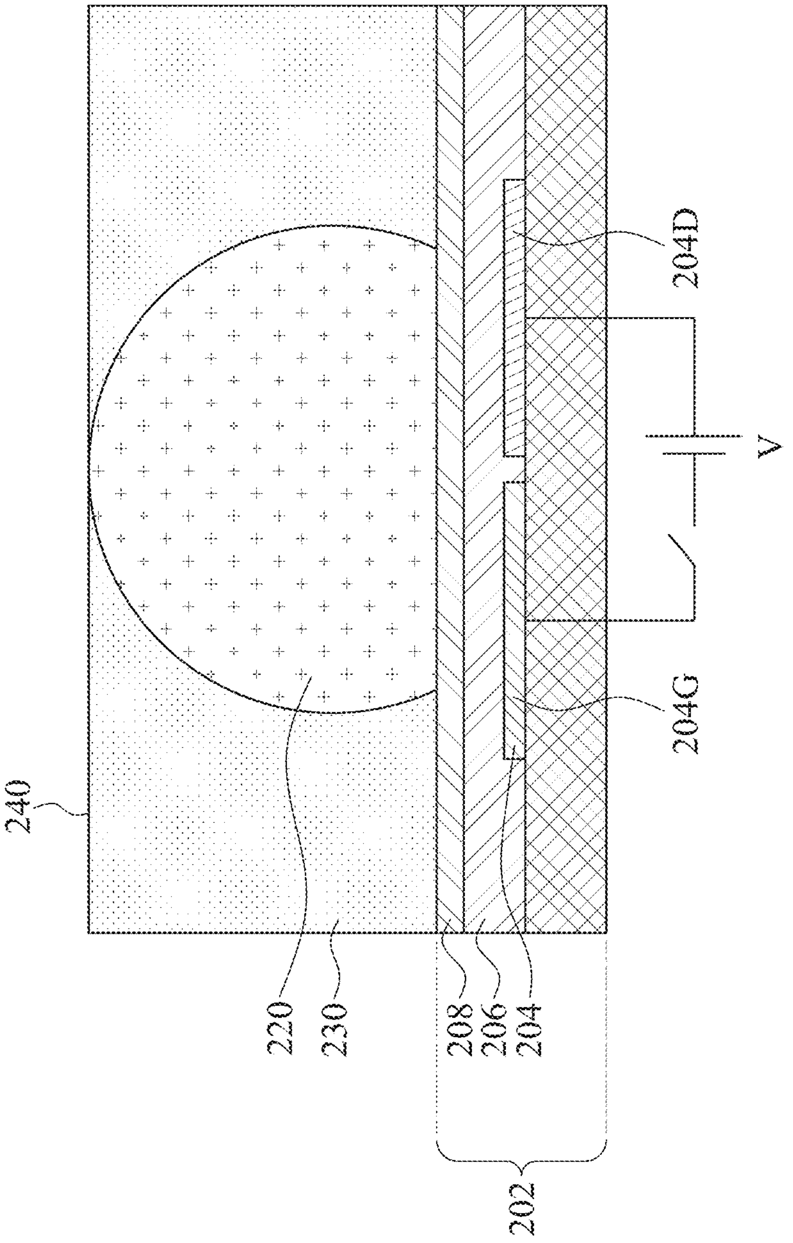
FIGS. 2A and 2B show two different configurations for a EWOD device according to some embodiments of the present disclosure.
Figure 2B:
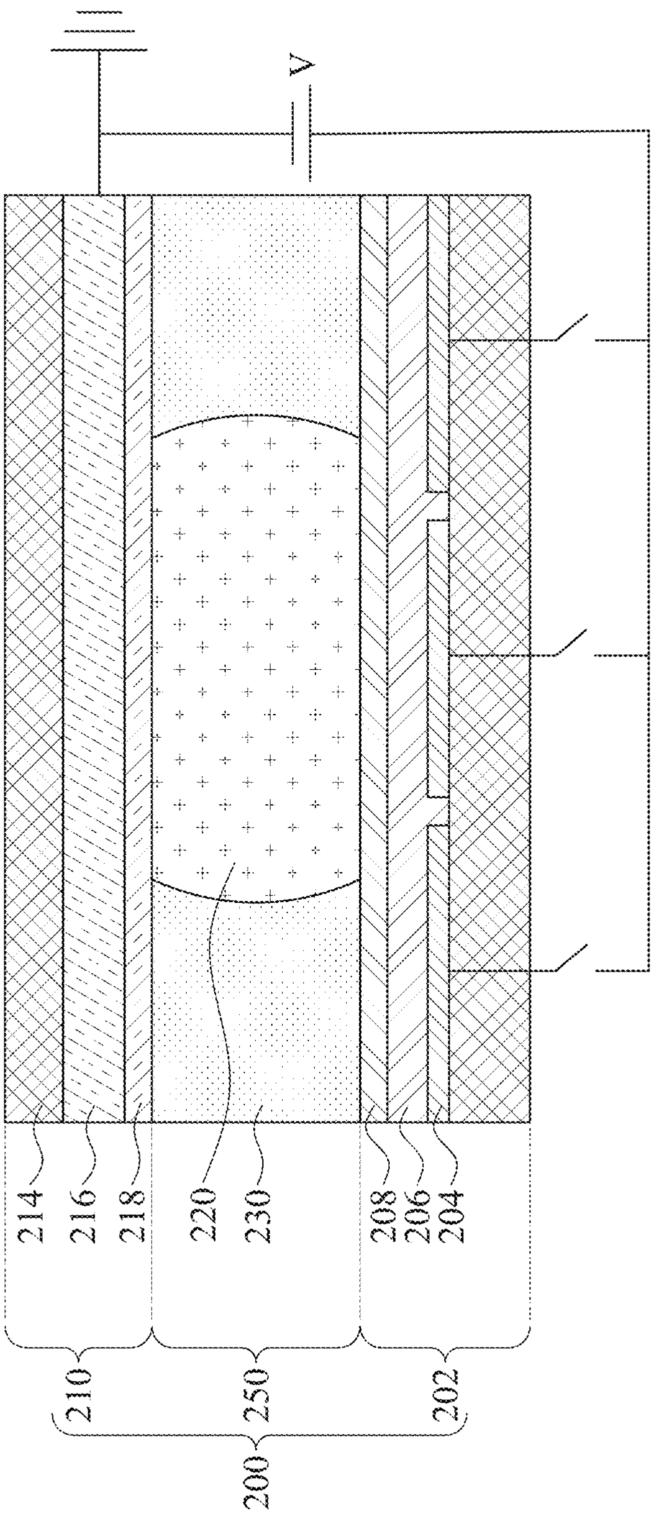

FIGS. 2A and 2B show another two different EWOD devices with an open configuration and a closed configuration FIG. 2A illustrates one EWOD devices of an open configuration. The droplet 220 is deposited on a bottom plate 202. The bottom plate 202 includes an electrode layer 204 and a hydrophobic layer 208. The electrode layer 204 is patterned to form a plurality of electrode pads. A dielectric layer 206 may be arranged between the electrode layer 204 and the hydrophobic layer 208. The hydrophobic layer 208 may be used as a dielectric layer, and thus the dielectric layer 206 may be inessential.

The droplet 220 is surrounded by the surrounding medium 230. An open surface 240 is on the droplet 220 and the surrounding medium 230 is opposite to the bottom plate 202. The open surface may be an ambient air or gas. The surrounding medium 230 is a fluid. In some embodiments, the surrounding medium 230 may be an immiscible electrolytic solution. The surrounding medium 230 may be oil.

The electrode layer 204 includes at least one driving electrode 204D and at least one grounded electrodes 204G. In some embodiments, as shown in FIG. 2A, a power supply with voltage V is applied to the droplet though the driving electrode 204D and the grounded electrode 204G; in this case, the driving electrode 204D has a higher electrical potential than the one of the grounded electrode 204G. In some embodiments, a power supply with voltage V is applied to the droplet though the driving electrode 204D and the grounded electrode 204G; in this case, the grounded electrode 204G has a higher electrical potential than the one of the driving electrode 204D. Under applied voltage, the droplet moves to the high electrical potential side.

In the open configuration, the droplet may have a higher velocity since the droplet is in contact with only one of the surfaces.

FIG. 2B illustrates an EWOD devices of a closed configuration. A fluid layer 250 is sandwiched by a top plate 210 and a bottom plate 202. A top plate 210 is placed on the fluid layer 250 opposite to the bottom plate 202.

The fluid layer 250 includes the droplet 220 and the surrounding medium 230. The droplet 220 is surrounded by the surrounding medium 230.

The top plate 210 includes a hydrophobic layer 218 and an electrode layer 214. A dielectric layer 216 may be arranged between the electrode layer 214 and the hydrophobic layer 218. The hydrophobic layer 218 may be used as a dielectric layer, and thus the dielectric layer 216 may be inessential.

The bottom plate 202 may include an electrode layer 204 and a hydrophobic layer 208. A dielectric layer 206 may be arranged between the electrode layer 204 and the hydrophobic layer 208. The electrode layer 204 is patterned to form a plurality of electrode pads.

A voltage V may be applied to the droplet 220 through the electrode layer 214 and at least one electrode pad of the electrode layer 204. The electrode layer 214 may connect to ground. The electrode pads of the electrode layer 204 may be driving electrodes. Each electrode pad of the electrode layer 204 may be individually controlled to be closed or open so as to precisely move the droplet 220.

Figure 3:
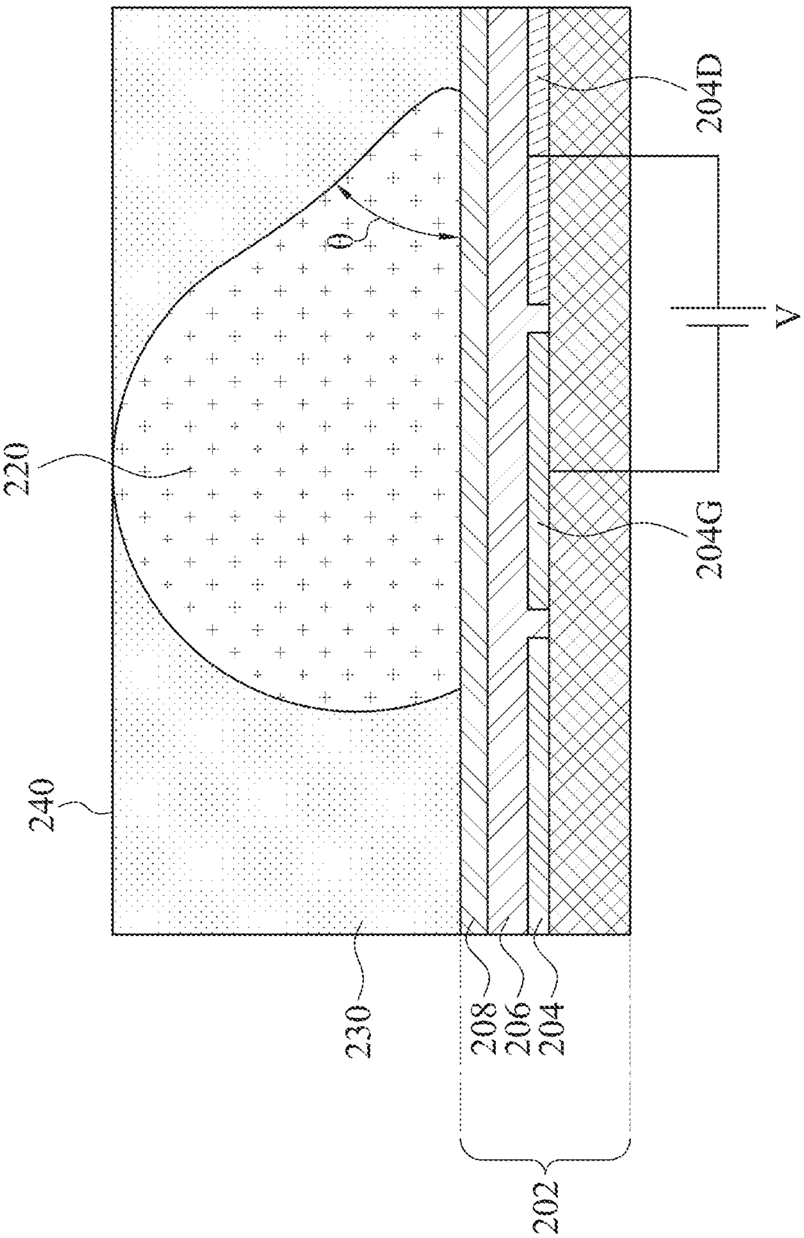
FIG. 3 is a schematic view illustrating the principle of electrowetting-on-dielectric (EWOD)

FIG. 3 shows how a droplet moves in the EWOD device of FIG. 2A. When a voltage V is applied to the driving electrode 204D, the contact angle between two sides of the droplet 220 varies significantly with potential difference between the driving electrode 204D and the grounded electrode 204G, resulting in a lateral force that moves the droplet 220 laterally on the bottom plate 202. In some embodiments, the speed of the droplet may be controlled by adjusting the voltage applied to the driving electrode 204D.

Figure 4:
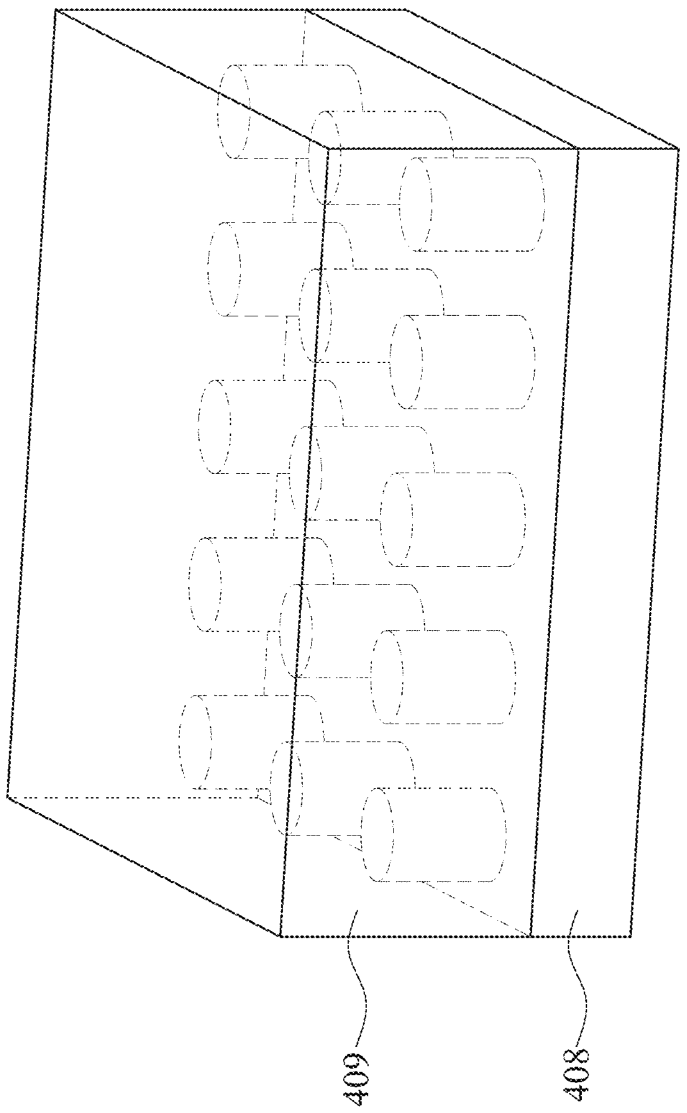
FIG. 4 shows an liquid infused-based coating according to some embodiments of the present disclosure.

FIG. 4 illustrates a part of an EWOD device of the present disclosure. An infused liquid layer 409 may be coated on the hydrophobic layer 408. The infused liquid layer 409 may be lubricant. The hydrophobic layer 408 may be patterned to form a textured surface. The hydrophobic layer 408 and the infused liquid layer 409 may form an liquid infused-based coating on an electrode.

The textured surface of the hydrophobic layer 408 is designed to trap the infused liquid layer 409 so that the textured surface becomes infused, and thus the infused liquid layer 409 may be stabilized on a textured surface. Specifically, the textured surface may increase hydrophobicity and prevent the infused liquid layer flowing away.

The hydrophobic layer of a bottom plate of the EWOD device is patterned to form a textured surface. In some embodiments, the hydrophobic layer of a top plate of the EWOD device is patterned to form a textured surface. In some embodiments, the hydrophobic layer of both top and bottom plates are patterned to form textured surfaces.

The surrounding medium, such as oil, surrounding a droplet may avoid the droplet being evaporated during operation. Even so, oil as surrounding medium can weaken the EWOD phenomenon due to the high viscosity thereof, which can further require higher voltage for EWOD operations, potentially leading to a breakthrough of the dielectric layer or making it physically unachievable. In some embodiments, the oil may react with or dilute the infused liquid layer. Furthermore, over time, viscosity of the surrounding medium can increase, further compromising EWOD performance. Commensurately viscosity of the infused liquid layer decreases, even more decaying performance of EWOD.

It is thus desirable to provide an EWOD apparatus which addresses the problems detailed. Some further embodiments of the present disclosure can provide liquid infused-based coating in combination with the surrounding medium, based on dissolvability of each material.

Figure 5:
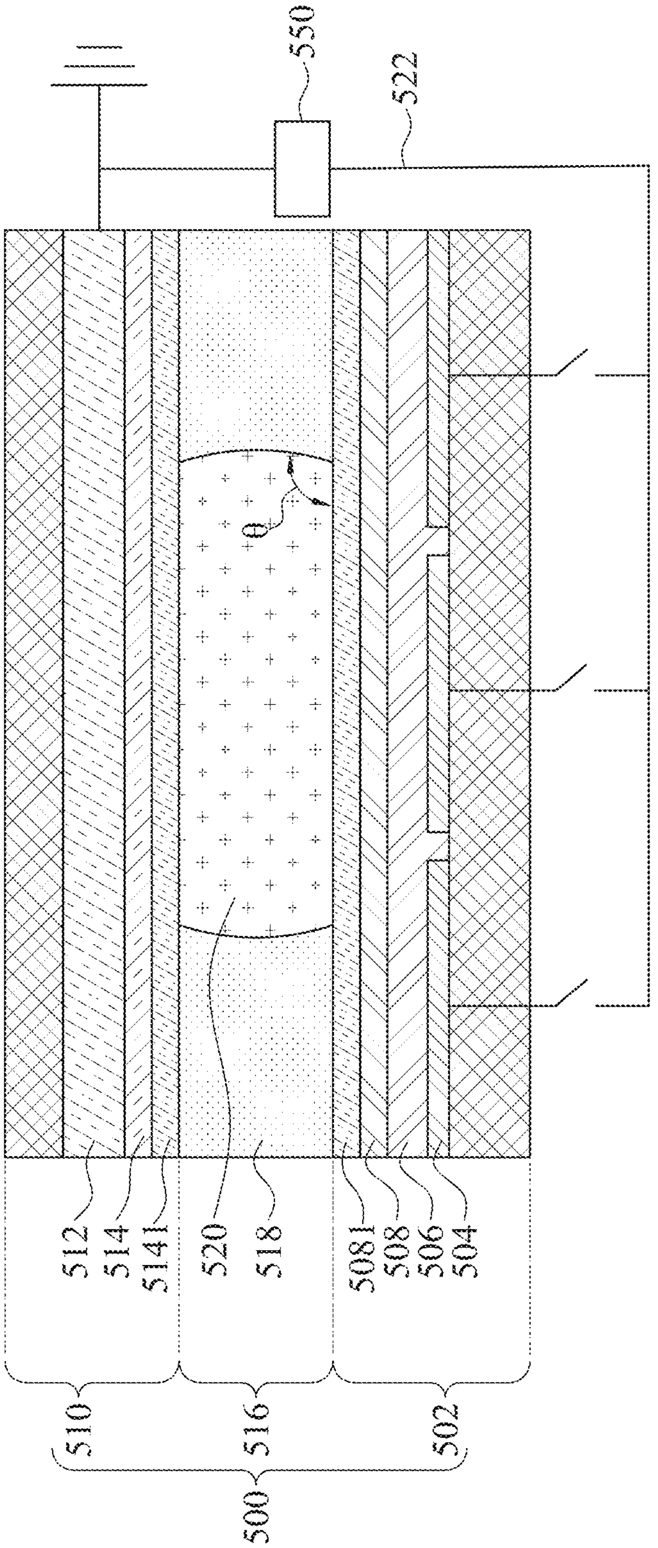
FIG. 5 shows a EWOD device according to some embodiments of the present disclosure.

FIG. 5 illustrates an EWOD device according to some embodiments of the present disclosure. Referring to FIG. 5, an electrowetting-on-dielectric (EWOD) device 500 is disclosed. The EWOD device 500 may receive one or more droplets 520 of fluids. The EWOD device 500 includes a substrate 502. The substrate 502 includes a plurality of electrodes 504. The electrodes 504 respectively controllably connected to a processer 550 through signal lines 522. Each of the electrodes 504 may be individually controlled to be open or closed.

The substrate 502 may include a hydrophobic layer 508 disposed over a plurality of electrodes 504. The substrate 502 may further include a dielectric layer 506 disposed between the plurality of electrodes 504 and the hydrophobic layer 508. The dielectric layer 506 may be inessential.

The EWOD device 500 may include a substrate 510 opposite to the substrate 502. The substrate 510 includes an electrode 512 configured to be connected to the processor 550. The substrate 510 may include a hydrophobic layer 514 disposed over the electrode 512. The substrate 510 may further include a dielectric layer (not shown in FIG. 5) disposed between the electrode 512 and the hydrophobic layer 514.

A distance between the substrate 502 and the substrate 510 is in a range from 100 μm to 1000 μm, optionally from 100 μm and 800 μm, optionally from 100 μm and 500 μm.

An internal space 516 between the substrate 502 and the substrate 510 receiving the droplets 520 and a surrounding medium 518. Droplets 520 are within surrounding medium 518. In some embodiments, contact angle Θ between the droplets 520 and the hydrophobic layer 508 may be in a range from 60° to 170°. In some embodiments, contact angle Θ between the droplets 520 and the hydrophobic layer 508 may be in a range from 90° to 170°.

Similar to the embodiments shown in FIG. 4, the hydrophobic layer 508 of the EWOD 500 may be patterned to form a textured surface. The textured surface may be designed to be a porous structured surface 508 to trap the infused liquid layer. The textured surface of the hydrophobic layer 508 may be a slippery liquid-infused porous surface (SLIPS). An infused liquid layer 5081 may be applied on the hydrophobic layer 508. This infused liquid layer gives the textured surface a slippery property that repels incoming fluids away from the substrate.

The infused liquid layer 5081 may cover the hydrophobic layer 508. The infused liquid layer 5081 may contact the textured surface of the hydrophobic layer 508. The infused liquid layer 5081 may be a single layer or multiple layers.

Similar to the hydrophobic layer 508, the hydrophobic layer 514 may be patterned to form a textured surface. The textured surface of the hydrophobic layer 514 may be a slippery liquid-infused porous surface (SLIPS). An infused liquid layer 5141 may be applied on the hydrophobic layer 514. The infused liquid layer 5141 may cover the hydrophobic layer 514. The infused liquid layer 5141 may contact the textured surface of the hydrophobic layer 514. The infused liquid layer 5141 may be a single layer or multiple layers.

The material of the infused liquid layer 5141 may be the same to the material of the infused liquid layer 5081. In some embodiments, the material of the infused liquid layer 5141 may be different from the material of the infused liquid layer 5081.

The droplets 520 and the surrounding medium 518 may contact the infused liquid layer 5081. The droplets 520 and the surrounding medium 518 may contact the infused liquid layer 5141.

In the present disclosure, a viscosity of the surrounding medium 518 may be lower than a viscosity of the infused liquid layer 5081, 5141. In the present disclosure, the surrounding medium 518 would not react with the infused liquid layer 5081, 5141.

In some embodiments, a viscosity of the surrounding medium 518 is lower than a viscosity of the infused liquid layer 5081, 5141.

The viscosity of the infused liquid layer 5081, 5141 may range approximately from 2 cst to 1000 cst, optionally from 2 cst to 500 cst, optionally from 2 cst to 350 cst, optionally from 2 cst to 100 cst, optionally from 2 cst to 50 cst.

The surrounding medium 518 may be fluorinated oil. In some embodiments, the surrounding medium 518 may be silicone oil. In some further embodiments, the surrounding medium 518 may be selected from mineral oil, hexadecane and decane.

The viscosity of the surrounding medium 518 may range approximately from 0.01 cst to 100 cst, preferably from 0.01 cst to 50 cst, optionally from 0.05 cst to 50 cst, and optionally from 0.1 cst to 50 cst.

In some embodiments, the surrounding medium 518 may be silicone oil with a viscosity of 2 cst, and the infused liquid layer may be silicon oil with a viscosity of 100 cst.

In some embodiments, the surrounding medium 518 may be mineral oil with a viscosity of 20 cst, and the infused liquid layer may be fluorinated oil with a viscosity of 50 cst.

In some embodiments, the surrounding medium 518 may be mineral oil with a viscosity of 20 cst, and the infused liquid layer may 5081 include more than one layers. The surrounding medium has a lower viscosity compared to the one of the infused liquid layer, allowing the droplet to move easily. In addition, the viscosity difference between surrounding medium and the infused liquid layer may reduce the possibility of reaction or exchange of their positions. In some embodiments, a larger viscosity difference results in better performance of the EWOD device. Specifically, a higher viscosity of the infused liquid layer (e.g. greater than 10 cst, preferably greater than 20 cst, or even more preferably greater than 50 cst) increases the likelihood of it being well-trapped by the textured surface and a lower viscosity of the surrounding medium makes it easier for the droplet to move.

In some embodiments, the surrounding medium 518 may be oil. The surrounding medium 518 may be fluorinated oil. In some embodiments, the surrounding medium 518 may be silicone oil. In some embodiments, the surrounding medium 518 may mineral oil. In some embodiments, the surrounding medium 518 may be hexadecane. In some embodiments, the surrounding medium 518 may be decane.

In some embodiments, the surrounding medium 518 may be selected from the group of fluorinated oil, silicone oil, mineral oil, hexadecane, and decane. The surrounding medium 518 provides increased hydrophobicity, and prevents droplet evaporation.

In some embodiments, the infused liquid layer 5081, 5141 may be fluorinated oil. In some embodiments, the infused liquid layer 5081, 5141 may be silicone oil.

A combination of infused liquid layer and surrounding medium is selected for not dissolving with each other. The combination of infused liquid layer and surrounding medium is selected for not reacting with each other. As an example, the fluorinated oil contains fluorine, which is non-reactive, thus, silicone oil, mineral oil, hexadecane, decane and other chemicals which do not contain fluorine will neither react nor dissolve with fluorinated oil.

The infused liquid layer and the surrounding medium cannot react or dissolve, to prevent viscosity of the infused liquid layer from decreasing, which will affect the hydrophobicity of the hydrophobic layer, and to prevent viscosity of the surrounding medium from increasing, which will increase the resistance of the EWOD operation.

Figure 6A:
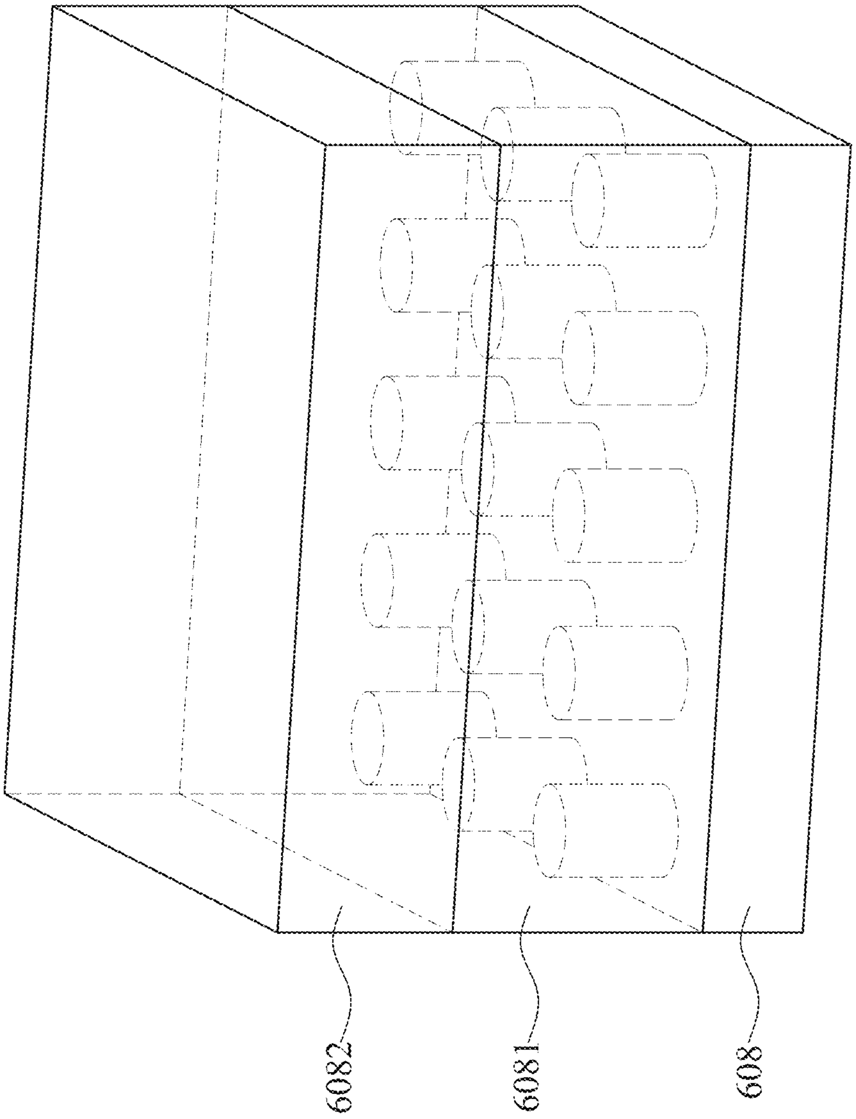
FIGS. 6A and 6B show two different liquid-infused coating structures according to some embodiments of the present disclosure.
Figure 6B:
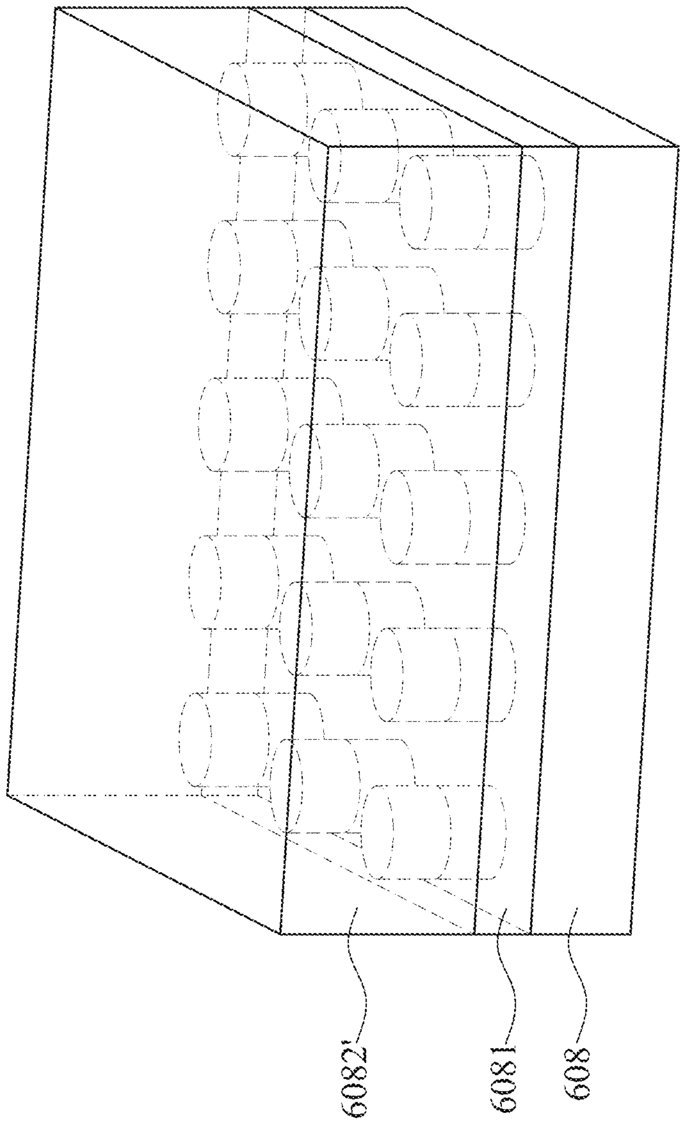

In some embodiments, the infused liquid layer include more than one layers, as shown in FIGS. 6A and 6B.

FIG. 6A illustrates some embodiments of the present disclosure. The EWOD includes the hydrophobic layer 608. The hydrophobic layer 608 may include a textured surface. The hydrophobic layer 608 may be completely covered by the infused liquid layer 6081, followed by the infused liquid layer 6082 (not dissolved with the infused liquid layer 6081).

FIG. 6B illustrates some embodiments of the present disclosure. The surface of the hydrophobic layer 608 may be partly or completely covered by the infused liquid layer 6081. The infused liquid layer 6081 may be partly covered by the infused liquid layer 6082' (not dissolved with the infused liquid layer 6081).

In some embodiments, the infused liquid layer 6081 and the infused liquid layer 6082, 6082' are the same solvent with different viscosities. In some embodiments, the infused liquid layer 6081 and the infused liquid layer 6082, 6082' are different solvents.

In some embodiments, the infused liquid layer 6082, 6082' contacting the surrounding medium/droplet has a lower viscosity than the infused liquid layer 6081.

In some embodiments, the infused liquid layer 6081, being the first layer, may be silicone oil with a viscosity of 350 cst; the infused liquid layer 6082, 6082', being the second layer, may be silicone oil with a viscosity of 100 cst; and the surrounding medium 280, may be mineral oil with a viscosity of 20 cst.

In some embodiments, the infused liquid layer 6081, being the first layer, may be hexadecane; the infused liquid layer 6082, 6082', being the second layer, may be silicone oil; and the surrounding medium may be mineral oil.

In some embodiments, the infused liquid layer 6081, being the first layer, may be hexadecane; the infused liquid layer 6082, 6082', being the second layer, may be silicone oil; and the surrounding medium may be fluorinated oil.

More specifically, the infused liquid layer 6081 includes hexadecane, and the infused liquid layer 6082, 6082' is silicone oil.

The following table provides more example cases for the liquid-infused coating design for a single layer structure.

| Example Case | Infused liquid layer Chemical | Viscosity | Surrounding Medium Chemical | Viscosity |
|---|---|---|---|---|
| 1 | Silicone Oil | 10 cst | Fluorinated Oil | 0.77 cst |
| 2 | Silicone Oil | 20 cst | Fluorinated Oil | 1.5 cst |
| 3 | Silicone Oil | 100 cst | Fluorinated Oil | 10 cst |
| 4 | Fluorinated Oil | 5 cst | Silicone Oil | 0.65 cst |
| 5 | Fluorinated Oil | 20 cst | Silicone Oil | 5 cst |
| 6 | Fluorinated Oil | 50 cst | Silicone Oil | 3 cst |
| 7 | Fluorinated Oil | 100 cst | Mineral Oil | 15 cst |
| 8 | Fluorinated Oil | 200 cst | Mineral Oil | 50 cst |
| 9 | Fluorinated Oil | 20 cst | Hexadecane | 4.29 cst |
| 10 | Fluorinated Oil | 30 cst | Decane | 1.16 cst |

The following table provides more example cases for the liquid-infused coating design for a multiple layers structure.

| Example Case | Infused liquid layer 1 Chemical | Viscosity | Infused liquid layer 2 Chemical | Viscosity | Surrounding Medium Chemical | Viscosity |
|---|---|---|---|---|---|---|
| 1 | Hexadecane | 4.29 cst | Silicone Oil | 3 cst | Fluorinated Oil | 0.77 cst |
| 2 | Mineral Oil | 15 cstcst | Hexadecane | 4.29 cst | Fluorinated Oil | 0.77 cst |

-continued

| Example Case | Infused liquid layer 1 Chemical | Viscosity | Infused liquid layer 2 Chemical | Viscosity | Surrounding Medium Chemical | Viscosity |
|---|---|---|---|---|---|---|
| 3 | Silicone Oil | 100 cst | Silicone Oil | 30 cst | Fluorinated Oil | 2.2 cst |
| 4 | Mineral Oil | 15 cst | Silicone Oil | 10 cst | Fluorinated Oil | 1.7 cst |
| 5 | Fluorinated Oil | 30 cst | Fluorinated Oil | 10 cst | Silicone Oil | 0.65 cst |
| 6 | Fluorinated Oil | 50 cst | Fluorinated Oil | 20 cst | Mineral Oil | 15 cst |
| 7 | Fluorinated Oil | 100 cst | Fluorinated Oil | 50 cst | Hexadecane | 4.29 cst |
| 8 | Fluorinated Oil | 50 cst | Fluorinated Oil | 10 cst | Decane | 1.16 cst |

Referring to FIG. 5, the processor 550 may provide power and/or control signals to the electrodes 504 through the signal lines 522 to control movements and positions of the droplets 520. In some embodiments, the processor 550 may provide an alternative current (AC) voltage source. In some embodiments, the processor 550 may provide a direct current (DC) voltage. The signal from the droplets may be read out through the electrodes 504. The read-out signal may be transmitted through signal lines 522. In some embodiment, the read-out signal may be transmitted through other signal lines.

The electrode 512 may electrically connect to ground.

In some embodiments, the voltage provided by the processor 550 may be in a range from 5V to 1000V, optionally from 5V to 800V, optionally from 5V to 500V, optionally from 5V to 100V, optionally from 5V to 80V, optionally from 5V to 50V.

In some embodiments, wherein the droplet size is in a range from 0.01 nL to 50 μL, optionally from 0.1 nL to 30 μL, optionally from 0.1 nL to 10 μL.

In some embodiments, the droplets 520 may be biologic samples. The droplets 520 may be blood. The droplets 520 may include DNA, RNA, genes, or the likes. The droplets 520 may include one or more of the following materials: PBS, Cell culture medium, enzyme, antibody, saliva, blood plasma, DMSO, Serum, Protein Solution, Ion Solution, Magnetic beads solution, SDS, PEG wash buffer, lyse buffer, elution buffer, FBS in DMEM, proteinase K, MgCl2 Solution, TE Buffer, PCR buffer, PCR Primer, Ethanol.

In some embodiments, the hydrophobic layer 508 may include low molecular weight silanes or siloxanes that have one or more hydrolysable groups. In some embodiments, the hydrophobic layer 508 is formed with low molecular weight silanes or siloxanes that have one or more hydrolysable groups. In some embodiments, the silanes or siloxanes of the hydrophobic layer 508 have a molecular weight of less than about 1,500 g/mol.

In some embodiments of the present disclosure, the hydrophobic layer 508 may include a fluoropolymer in a solid form. In further embodiments, the infused liquid layer 5081 may be fluorinated oil. Silicon oil may be selected as the surrounding medium since silicon oil provides the advantages of high biocompatibility and low price.

The foregoing outlines features of several embodiments and detailed aspects of the present disclosure. The embodiments described in the present disclosure may be readily used as a basis for designing or modifying other processes and structures for carrying out the same or similar purposes and/or achieving the same or similar advantages of the embodiments introduced herein. Such equivalent constructions do not depart from the spirit and scope of the present disclosure, and various changes, substitutions, and alterations may be made without departing from the spirit and scope of the present disclosure.

What is claimed is:

1. An electrowetting-on-dielectric (EWOD) device, comprising:
- a first substrate; and
- a second substrate opposite to the first substrate;
  - the first substrate comprising:
    - a plurality of first electrodes configured to be respectively controllably connected to signal lines;
    - a first hydrophobic layer disposed over the plurality of first electrodes;
  - the second substrate comprising:
    - a second electrode configured to be connected to the signal lines;
    - a second hydrophobic layer disposed over the second electrode;
- an internal space between the first substrate and the second substrate for receiving a droplet and a surrounding medium, the droplet surrounded by the surrounding medium,
- wherein the surrounding medium is fluorinated oil,
- wherein at least one of the first hydrophobic layer and the second hydrophobic layer is covered by an infused liquid layer, wherein:
- the infused liquid layer comprises a first layer and a second layer,
- the first layer of the infused liquid layer is hexadecane, and
- the second layer of the infused liquid layer is silicone oil.

2. The EWOD device of claim 1, wherein at least one of the first hydrophobic layer and the second hydrophobic layer comprises a textured surface contacting the infused liquid layer.

3. The EWOD device of claim 1, wherein a viscosity of the surrounding medium is lower than a viscosity of the infused liquid layer.

4. The EWOD device of claim 3, wherein the viscosity of the infused liquid layer ranges approximately from 2 cst to 1000 cst.

5. The EWOD device of claim 3, wherein the viscosity of the surrounding medium ranges approximately from 0.001 cst to 100 cst.

6. The EWOD device of claim 1, wherein the first substrate further comprises a first dielectric layer disposed over the plurality of first electrodes.

7. The EWOD device of claim 6, wherein the second substrate further comprises a second dielectric layer disposed between the second electrode and the second hydrophobic layer.

8. The EWOD device of claim 1, wherein the first substrate has a structured surface facing to the second substrate.

9. The EWOD device of claim 1, wherein the signal lines are configured to generate control signals to control a movement and a position of the droplet.

10. The EWOD device of claim 1, wherein the signal lines electrically connect to an alternative current (AC) voltage source.

11. The EWOD device of claim 1, wherein the signal lines electrically connect to a direct current (DC) voltage source.

12. The EWOD device of claim 1, wherein the second electrode electrically connects to ground.

13. The EWOD device of claim 1, wherein the signal lines are configured to read out signals from each electrode of the plurality of first electrodes.

14. The EWOD device of claim 1, wherein the droplet has a size in the range from 0.01 nL to 50 μL.

15. The EWOD device of claim 1, wherein the droplet comprises a biologic sample.

16. An electrowetting-on-dielectric (EWOD) device, comprising:

a first substrate; and a second substrate opposite to the first substrate;

the first substrate comprising:

a plurality of first electrodes configured to be respectively controllably connected to signal lines;

a first hydrophobic layer disposed over the plurality of first electrodes;

the second substrate comprising:

a second electrode configured to be connected to the signal lines;

a second hydrophobic layer disposed over the second electrode;

an internal space between the first substrate and the second substrate for receiving a droplet and a surrounding medium, the droplet surrounded by the surrounding medium, wherein the first hydrophobic layer is covered by an infused liquid layer, wherein at least one of the first hydrophobic layer and the second hydrophobic layer has a textured surface, wherein at least one of the first hydrophobic layer and the second hydrophobic layer comprises a fluoropolymer in a solid form, and wherein:

the infused liquid layer comprises a first layer and a second laver, the first layer of the infused liquid layer is hexadecane, and the second layer of the infused liquid layer is silicone oil.

* * * * *